March 3, 1931.  R. RICHTER  1,794,419
MAGNIFIER
Filed April 16, 1930

Inventor:
Robert Richter

Patented Mar. 3, 1931

1,794,419

UNITED STATES PATENT OFFICE

ROBERT RICHTER, OF JENA, GERMANY, ASSIGNOR TO THE FIRM OF CARL ZEISS, OF JENA, GERMANY

MAGNIFIER

Application filed April 16, 1930, Serial No. 444,824, and in Germany May 18, 1929.

The well-known aplanatic magnifier according to Steinheil, which consists of an equilateral collective lens and two dispersive lenses that are equal to each other and cemented to the former, affords sharp images of plane objects, without colour fringes up to the edges, and, owing to its symmetric construction, the distance between the eye and the magnifier influences but very slightly the definition of the image. The known magnifiers consisting of two lenses cemented together do not have this property and require a short distance from the eye in one direction and a comparatively great one in the other.

The invention relates to a magnifier consisting of a dispersive lens and a converging lens cemented thereto, viz., to an unsymmetric magnifier which affords the advantages of the Steinheil magnifier not only near the axis but also with a comparatively great free lens diameter. With a magnifier whose free lens diameter is greater than 40 hundredths of its focal length the said effect can be attained by giving it according to the invention such dimensions that the radius of curvature of the exterior surface of the dispersive lens is at least 40 hundredths and at most 83 hundredths of the radius of curvature of the exterior surface of the collective lens, and by giving the cemented surface a radius of curvature of at least 30 hundredths and at most 40 hundredths of the focal length of the magnifier.

The magnifier consisting of two lenses only, it allows being given a thickness inferior to that according to Steinheil and for this reason, when the thickness in the optical axis amounts at most to 60 hundredths of the free lens diameter, the new magnifier specially adapts itself to being used as a folding magnifier.

Figure 1:
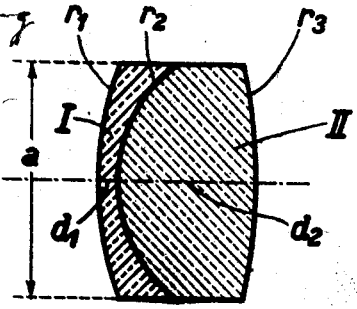
Figure 2:
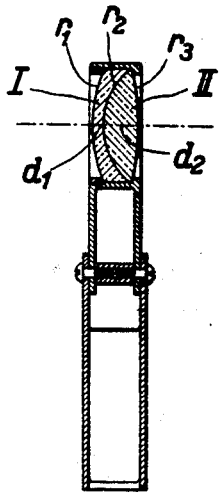
Figure 3:
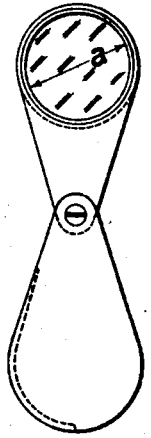

The accompanying drawing illustrates the invention in two executional examples. Figure 1 shows a central section of the optical parts of the first example, Figures 2 and 3 show the second example, a folding magnifier, in a longitudinal central section and in a lateral view, respectively. The two lenses of the magnifier are designated I and II.

In the following table showing the different combinations for the examples, $a$ designates the free lens diameters, $b$ the focal lengths, $r$ the radii, $d$ the thicknesses of lens, $n_D$ the refractive indices, and $\nu$ the Abbe figures.

First example (Figure 1)

| $a=$ 23.0 | $b=41.8$ | | |
|---|---|---|---|
| $r_1=+32.12$ | $d_1=2.0$ | $n_D=1.61992$ | $\nu=36.3$ |
| $r_2=+14.01$ | $d_2=14.6$ | $n_D=1.56018$ | $\nu=61.2$ |
| $r_3=-53.22$ | | | |

Second example (Figures 2 and 3)

| $a=$ 21.0 | $b=41.7$ | | |
|---|---|---|---|
| $r_1=+28.12$ | $d_1=2.0$ | $n_D=1.61992$ | $\nu=36.3$ |
| $r_2=+14.28$ | $d_2=7.1$ | $n_D=1.51625$ | $\nu=64.0$ |
| $r_3=-51.71$ | | | |

I claim:

1. A magnifier consisting of a dispersive lens and a converging lens cemented thereto, the free diameter of the lenses being at least 40 hundredths of the total focal length, the radius of curvature of the exterior surface of the dispersive lens being at least 40 hundredths and at most 83 hundredths of the radius of curvature of the exterior surface of the collective lens, and the radius of curvature of the cemented surface being at least 30 hundredths and at most 40 hundredths of the focal length of the magnifier.

2. A folding magnifier according to claim 1, the thickness of the magnifier being in the optical axis at most 60 hundredths of the free lens diameter.

ROBERT RICHTER.